United States Patent
Ten

(10) Patent No.: US 10,287,177 B1
(45) Date of Patent: May 14, 2019

(54) METHOD AND APPARATUS FOR EXTRACTING HIGH-PURITY MOLYBDENUM OXIDE POWDERS AND NANOPOWDERS FROM LOW-GRADE CONCENTRATES

(71) Applicants: Robert Ten, Almaty (KZ); Elena Makhnitskaya, Astana (KZ)

(72) Inventor: Robert Ten, Almaty (KZ)

(73) Assignees: Robert Ten (KZ); Elena Makhnitskaya (KZ)

( * ) Notice: Subject to any disclaimer, the term of this patent is extended or adjusted under 35 U.S.C. 154(b) by 0 days.

(21) Appl. No.: 15/973,555

(22) Filed: May 8, 2018

(51) Int. Cl.
  C22B 5/12 (2006.01)
  B01J 19/08 (2006.01)
  C01G 39/02 (2006.01)
  C22B 34/34 (2006.01)

(52) U.S. Cl.
  CPC ............. *C01G 39/02* (2013.01); *B01J 19/08* (2013.01); *C22B 5/12* (2013.01); *C22B 34/34* (2013.01); *B01J 2219/0879* (2013.01); *B01J 2219/0896* (2013.01); *C01P 2004/64* (2013.01); *C01P 2006/80* (2013.01)

(58) Field of Classification Search
  CPC .................................................. C01G 39/02
  See application file for complete search history.

(56) References Cited

U.S. PATENT DOCUMENTS 4,146,388 A * 3/1979 Lafferty .............. C22C 32/0031
  420/429
2008/0118422 A1 5/2008 Amelunxen et al.

FOREIGN PATENT DOCUMENTS

| EA | 004480 B1 | 4/2004 |
| EA | 200300020 A1 | 4/2004 |
| EA | 201201076 A1 | 12/2013 |
| EP | 0788460 A1 | 8/1997 |
| JP | 2016/191117 A | 11/2016 |
| RU | 2002839 C1 | 11/1993 |
| RU | 2252817 C1 | 5/2005 |
| RU | 2493280 C1 | 9/2013 |
| SU | 186687 A1 | 11/1966 |

* cited by examiner

*Primary Examiner* — Melissa S Swain
(74) *Attorney, Agent, or Firm* — IRL Legal Services, LLC; Ilya R. Lapshin

(57) ABSTRACT

A method and plant for molybdenum recovery from a low-grade crude ore by low-temperature chlorination, where the molybdenum-bearing fine ore is chlorinated with gaseous chlorine at a temperature of 220-250° C. to form a volatile chloride compound, which after leaving a reactor is directed to a low-temperature nitrogen-oxygen plasma unit having a temperature of 800-1000° C., wherein the said compound decomposes and turns into a high-purity $MoO_3$ powder or nanopowder, which is cooled with an air stream and collected in a dumping hopper. The invention enables recovery of ultra-high purity $MoO_3$ (purity of 99.997-99.999%) using an environmental friendly, cost effective, and inexpensive method implemented on an industrial scale.

20 Claims, 1 Drawing Sheet

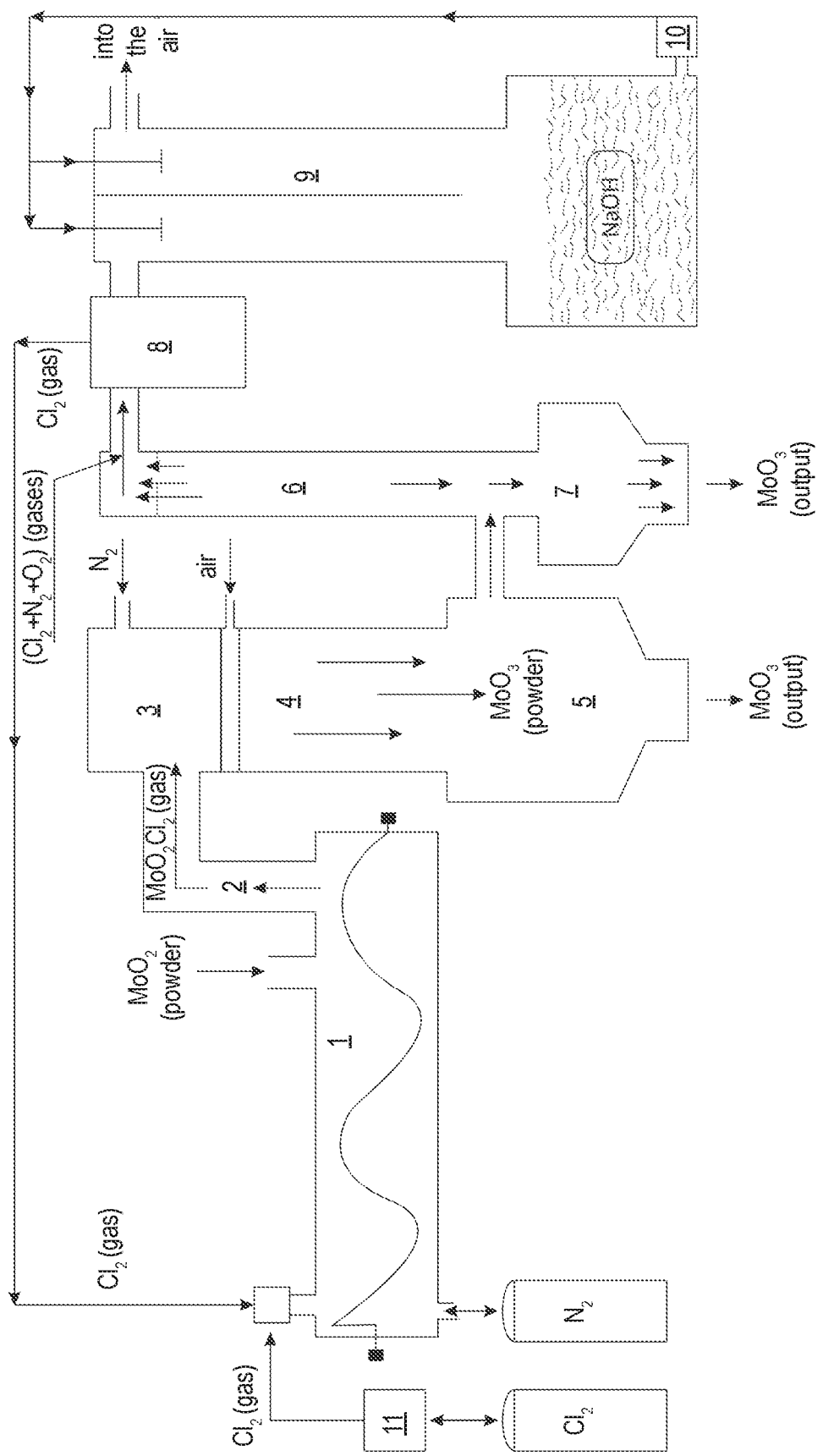

METHOD AND APPARATUS FOR EXTRACTING HIGH-PURITY MOLYBDENUM OXIDE POWDERS AND NANOPOWDERS FROM LOW-GRADE CONCENTRATES

BACKGROUND OF THE INVENTION

The invention pertains to the rare metals metallurgy, namely to the recovery and purification of molybdenum compounds by a gas-phase method.

Molybdenum (Mo) is a malleable transition metal characterized by a high melting point that explains its high heat resistance. Moreover, molybdenum-based alloys have a high specific strength due to their high density. Molybdenum is characterized by a high elastic modulus, a low thermal expansion coefficient, a good heat and corrosion resistance. This metal is resistant in most alkaline solutions, sulfuric, hydrochloric and hydrofluoric acids at different temperatures and concentrations.

Molybdenum is an important local element, taking into account its various oxidation degrees (0, +2, +3, +4, +5 and +6). The metal is a part of a wide range of compounds used in industry.

More than 90% of the world's molybdenum is used as an additive to non-ferrous and ferrous alloys, including steel; the remaining 10% is used for the manufacture of chemical reagents and lubricants. The electrical and electronics industries, as well as military, automotive, and aircraft construction industries use molybdenum as a composite element of steel. Production of inorganic molybdenum-containing dyes, stains and varnishes is another area of application. Molybdenum in trace amounts is increasingly used in fertilizers.

Molybdenum trioxide $MoO_3$ is one of the main molybdenum compounds used in industry. Pure molybdenum trioxide is applied as a laboratory chemical reagent, and commercially-pure molybdenum is used as a catalyst in the petrochemical industry and also as an integral part of ceramic clays, enamels and dyes. Molybdenum compounds are widely used as catalysts or catalysis activators, especially in the petrochemical industry for cracking and reforming of petroleum products and alkylation. Moreover, molybdenum-bearing substances are used for electroplating and etching.

Thus, modern industrial enterprises have a sufficiently high demand for molybdenum in considerable quantities.

The need to invent rational technologies to process refractory molybdenum ores is firstly associated with the reducing raw material base in the molybdenum industry. At the same time, modern industry makes high demands on the purity of materials it consumes.

Production of pure molybdenum compounds requires a number of complex technological processes for mineral ore preparation, its purification and further complex processing. For example, there is a method of producing a high-purity molybdenum. Based on the method, molybdenite concentrates (48-50% Mo) firstly undergo the oxidizing roasting, then the roasted product of $MoO_3$ with impurities is dissolved in ammonia water, and only then the purified $(NH_4)_6Mo_7O_{24}.4H_2O$ is extracted from the obtained solution of $(NH4)_2MoO_4$. $(NH_4)_6Mo_7O_{24}.4H_2O$ is further thermally decomposed to pure $MoO_3$, which is reduced to molybdenum by hydrogen at $T=900-1000°$ C.

Another widely used method described in the same reference is a method of recovering molybdenum by reduction from higher halogen compounds obtained, for example, by a chloride method of processing ore concentrates. The given method includes treatment of oxides with gaseous elemental chlorine in the presence of a reducing agent (carbon) at a temperature above 900° C., separation of chlorination products by condensation and subsequent metal recovery from them. The reduction is carried out either by hydrogen or metallothermically using magnesium, calcium, or sodium as a reducing agent or electrolytically.

The main disadvantage of these methods is high energy consumption resulted from the need to maintain high temperature and high pressure for a long time, as well as complex equipment used and low recovery rate and efficiency.

The Russian patent RU2002839 C1 issued Nov. 15, 1993, describes a method of processing poor molybdenum and tungsten materials through chlorination with gaseous chlorine at a room temperature in the presence of dimethylformamide.

Disadvantage of this method and those described above is incomplete recovery of molybdenum and tungsten from depleted ores, the complexity and energy intensity of the technology and an insufficient purification from impurities, which is due to similar values of temperatures for sublimation of main components in the vapor-gas mixture leaving the reactor. This does not allow efficiently separate all components of the concentrate and therefore to obtain high-purity chlorides, which are starter compounds for the subsequent recovery of pure substances from them. This technology is associated with large amounts of raw materials and auxiliary materials, resulting in a significant amount of various wastes during the chlorination process, including toxic and corrosive gases: elemental chlorine, hydrogen chloride, carbon oxides, phosgene, the neutralization of which is a complex and expensive engineering challenge. In addition, this technology requires expensive reducing agents.

The Eurasian patent EA004480 B1 issued Apr. 29, 2004, discloses a method of selective processing of poor molybdenum and tungsten materials by a continuous-flow method. This method uses selective extraction of tungsten anhydride by low-temperature chlorination using hydrometallurgy. For this purpose, tungsten and molybdenum compounds are transferred to the gas phase using a chlorination reaction at low temperatures close to the boiling point of volatile chloride compounds of recovered metals. Sulfur chloride or sulfur chloride was used in this case as a low-temperature chlorinating agent.

In case of the low-temperature chlorination process that is proposed in the abovementioned patent (maximum temperature of 250-320° C.), tungsten and molybdenum are recovered only in the form of one strictly defined chloride compound: tungsten oxytetrachloride $WOCl_4$ with a boiling point of 240° C. and molybdenum dioxydichloride $MoO_2Cl_2$ with a sublimation temperature of 160° C. There is only one associated component—chlorine iron with a boiling point of 320° C.

After the reactor, the obtained vapors of chlorinated oxides were selectively condensed in individual tandem tanks with specific temperatures corresponding to the condensation temperature of each target component. Special nozzles were used to capture each component.

Further, according to the information in EA004480, the obtained chlorinated tungsten product was converted to the target substance by means of hydrolysis in an aqueous medium with the release of gaseous hydrogen chloride which was trapped in an irrigation tower. However, this method is not suitable for molybdenum, since $MoO_3$ does not leach out in alkaline solutions, while hydrometallurgy is a complex and expensive process in this case.

Thus, the main disadvantage of the method described in EA004480 is the hydrometallurgy of rare metals that greatly increases the cost and complexity of the technological process.

Moreover, the given process requires preliminary synthesis of sulfur chloride. There are sulfur-bearing by-products such as $SO_2$, which require a handling system (washing tower, irrigation tower, drop catcher, desiccator, compressor) and subsequent processing.

Another method was also proposed to process molybdenum-bearing raw materials by converting ore components to a gas phase by low-temperature chlorination as described in the Eurasian patent application EA201201076 A1 published on Dec. 30, 2013. In this case, molybdenum trioxide is first reduced to molybdenum dioxide by hydrogen, the obtained product is then granulated and chlorinated with elemental chlorine at low temperature. This technology comprises several stages and involves additional reagents, such as hydrogen, which complicates the technical implementation and increases the cost.

There are several methods for recovering pure molybdenum trioxide $MoO_3$. A hydrometallurgical method is used the most. The method is based on the treatment of the roasted concentrate with ammonia solutions and is usually called the ammonia process. The ammonia process provides for the leaching of the roasted product to produce solutions of ammonium heptamolybdate; the solutions are purified of impurities, and ammonium heptamolybdates are precipitated and subjected to thermal decomposition.

Another popular method of producing pure molybdenum trioxide is sublimation, which is possible due to the high volatility of this compound. Molybdenum anhydride begins to volatilize before melting. Pressure of $MoO_3$ vapors increases significantly at the melting point (795° C.), and there is a sufficiently high rate of evaporation at 900° C. The sublimation process is accelerated with the continuous removal of $MoO_3$ vapors using an air stream or vacuum. The sublimed molybdenum trioxide has a purity of up to 99.975% Mo but is highly dispersed; that often poses difficulties for its further reduction by hydrogen and for its use in industry.

These methods also have disadvantages associated with the need to maintain high temperatures. Moreover, purification as a separate process may be unreasonably expensive and energy intensive.

As can be seen from the above, this field of industry has a need to develop an efficient, fast and inexpensive method of extracting molybdenum of high purity from depleted ores. At the same time, in order to meet the needs of the field this method should be easy to carry out not only in a laboratory, but also at a site with intensive industrial production.

BRIEF SUMMARY OF THE INVENTION

In order to solve the problem, a highly selective method of extracting molybdenum, is proposed without affecting other components of the feedstock contaminating the purity of the recovered metal. This helps to recover ultra-high-purity molybdenum trioxide commercially.

This became possible due a combination of low-temperature chlorination and low-temperature plasma technologies that were not previously studied, not described and not used in practice.

In particular, it is proposed to use a method of recovering molybdenum from low-grade crude ore by chlorination at low temperatures, where finely dispersed molybdenum-bearing feedstock is chlorinated at a temperature of 220-250° C. In this case, the chlorination process involves gaseous chlorine to form an easily volatile chloride compound, which is sublimated at these temperatures and exits the reactor. After the reactor, the sublimate is directed to a low-temperature nitrogen-oxygen plasma unit having a temperature of 800-1000° C., where the compound decomposes to a high-purity $MoO_3$ powder (or nanopowder), which is cooled and collected in a dumping hopper.

The particle size of the ore being charged can make up 30-50 μm.

The reactor is treated with an inert gas (argon or nitrogen) to remove air before chlorination.

The crude ore is loaded into the reactor through a screw in countercurrent to chlorine.

Prior to be fed into the plasma unit, the sublimate is filtered through a granular material to remove related impurities.

Finest particles not settled in the hopper may be trapped in additional filtration sleeves with subsidence in additional dumping hoppers.

After leaving the plasma unit, excessive and precipitated chlorine is purified of nitrogen and oxygen and directed to the reactor for reuse.

A scrubber located at a terminal part of the plant is used in conjunction with alkaline solution for the neutralization of possible chlorine in case of emergency.

In another aspect the invention pertains to the low-temperature chlorination plant for molybdenum recovery from low-grade crude ore by the method described above. This plant includes the following components:

reactor for low-temperature chlorination of molybdenum-bearing ore, designed to maintain a temperature range of 220-250° C. and equipped with special means for uniform supply of gaseous chlorine and crushed mineral ore to the reactor;

low-temperature nitrogen-oxygen plasma unit with a temperature of 800-1000° C. for the decomposition of chlorinated compound of molybdenum;

hopper to collect $MoO_3$ powder or nanopowder generated in the plasma unit; and chlorine regeneration assembly for the purification from related gaseous impurities, which outlet is connected with the inlet of the chlorination reactor.

Optionally the plant may be equipped with a filtration system for separation of impurities, which is located between the reactor and the plasma unit. The filtration system may represent a series of reservoirs with granular reagents consequently installed in a gas duct and designed specifically for trapping each impurity.

The scrubber is provided for at a terminal part of the plant for the alkaline neutralization of possible chlorine in case of emergency.

The plant may have a system of temperature sensors and pressure sensors, raw material and reagent feed sensors, finished product discharge sensors for an automated control of the process.

A special unit to heat supplied chlorine up to 50-60° C. may be optionally installed before the reactor's inlet.

The invention enables recovery of high-purity molybdenum (purity of 99.997-99.999%) using a cost effective and environmental friendly method due to the exclusion of labor consuming, material-intensive and energy consuming stages and the recirculation of used oxidant.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE SEVERAL VIEWS OF THE DRAWING

The drawing is not necessarily to scale; emphasis has instead been placed upon illustrating the principles of the invention. The FIGURE presents a technological workflow of the example plant, which is one embodiment of the invention.

DETAILED DESCRIPTION

An example embodiment of the invented plant schematically illustrated in the FIGURE operates based on the low-temperature chlorination technology (LTC) and designed for the recovery of high-purity molybdenum dioxydichlorides from any low-grade molybdenum dioxide ores ($MoO_2$), which form a basis for the recovery of high-purity $MoO_3$ powders and nanopowders, while the plant's capacity makes up at least 250 tons per annum.

In this embodiment, the whole process runs in a gas environment at T=220-250° C. in a closed cycle with no harmful emissions into the atmosphere as almost all used chlorine is recycled, therefore the process is completely environmental friendly.

In this embodiment, the plant consists of the following assemblies:

The continuously operating LTC reactor, which provides chlorination of $MoO_2$ ore by gaseous chlorine.

A specific nature of chlorination reactions at low temperatures in comparison with standard reactions (700-900° C.) poses certain requirements to the design of the reactor and its operational mode.

The reactor 1 is a cylindrical horizontally mounted chamber made of nickel, Monel, or other material, resistant to such aggressive medium as chlorine at operational temperatures. The feedstock is supplied continuously by portions through a feed-control device, which automatically supplies a set amount of the feedstock to the reactor, depending on the desired output.

A pure-nickel screw rotates in the reactor and mixes the loaded $MoO_2$ ore to evenly heat powders and avoid agglomeration of powders.

The system is preliminary blown down by argon or gaseous nitrogen at a rate of 300 l/min for air removal from the system, and all plant assemblies are simultaneously heated up to 220-250° C. The heating is provided by panel folding heaters equipped with embedded heating elements made of heat-resistant materials.

External heaters make it possible to easily replace heating elements if necessary without a need to dismantle the reactor's housing.

Gaseous chlorine is supplied to the reactor 1 from a liquid chlorine bulb after passing through a heater/evaporator 11 with a capacity of 50 l, where chlorine is heated to the temperature required for chlorination (approximately 60° C.). Gaseous chlorine is supplied in excess at a preferable rate of 75 l/min for the most complete chlorination process.

The chlorination process is carried out between gaseous reagents and solid feedstock; therefore, its effectiveness depends on the contact area between these phases, i.e. on the fineness degree of the raw material. The feedstock must be finely divided with a particle size of 30-50 μm to ensure effectiveness of the process. The fine-dispersed raw material is fed into the reactor in countercurrent to chlorine.

As a result, chlorination of $MoO_2$ takes place in the reactor 1. A temperature of at least 200° C., preferably 220-250° C., is required for the reaction. In this case the reaction changes molybdenum only to $MoO_2Cl_2$:

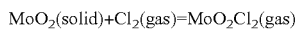
$$MoO_2(solid)+Cl_2(gas)=MoO_2Cl_2(gas)$$

This is an exothermic reaction, taking place with minor heat release.

Given the specified temperatures, $MoO_2Cl_2$ vapors having a sublimation temperature of 157.6° C. are mainly sublimated.

It should be pointed out that some other elements, such as iron, vanadium, etc., presented in the crude ore are also sublimated along with the target molybdenum product. Such raw material components as non-ferrous metals, silicon, etc. do not react at process temperatures and remain in the charge.

The chlorination process is characterized by the following parameters corresponding to the technology implemented by its authors in practice:

operating flow rate of feedstock ($MoO_2$ powder)—30 kg/h;
feedstock fineness <900 μm;
molybdenum dioxydichloride recovery rate ($MoO_2Cl_2$)—46 kg/h;
product fineness—1-15 μm; and
system pressure—15-20 mm Hg.

Further, the obtained chlorination product $MoO_2Cl_2$ is sublimated and enters the gas duct 2, where the gas mixture is purified from contaminating impurities with the sublimate going through filters filled with granules of the corresponding reagents. Every filter is a cylinder made of pure nickel, having one side open and a mesh bottom on the other side. The preferred configuration of the system has three filters sequentially arranged in the gas duct 2 vertically one above the other.

A pure granulated salt NaCl is used to purify the gas mixture from iron impurities and other components. NaCl turns into a non-volatile compound and settles on salt granules when reacting with iron chloride vapors.

Fine copper chips are used to purify the mixture from vanadium impurities. When reacting with the chips, vanadium chloride vapors also turn into a non-volatile compound and settle on the copper chips.

A granular zeolite (such as rhionite) is used for final purification of impurities, which purifies gaseous molybdenum dioxychloride from mechanical impurities and moisture.

Reagents in the filters should be replaced in the course of production, depending on the amount of impurities contained in the feedstock. On average, the replacement takes place once every 15 days of plant operation.

After passing through the filtration system, the gaseous $MoO_2Cl_2$ purified of all impurities flows through the gas duct to the low-temperature arc plasma unit 3, where $MoO_2Cl_2$ decomposes in the low-temperature nitrogen-oxygen plasma (800-1500° C.) and turns into high-purity $MoO_3$ powder or nanopowder. The type of the powder depends on the temperature, mode, and residence time of the gas flow in the plasma unit.

The decomposition process using the low-temperature plasma is characterized by the following parameters:
high-purity $MoO_3$ powder recovery rate—33 kg/h; and
product fineness—20 to 30 μm, depending on the task, the fineness is regulated in the low-temperature plasma unit by adjusting the residence time of particles in the cooling reactor and the plasma temperature; and
system pressure—1 atm or 760 mm Hg.

The obtained high-purity $MoO_3$ powders or nanopowders are cooled in the reactor 4, which is cooled by cold running water circulating through a cooling circuit. Then, the powder settles in the receiving hopper 5, while smaller unsettled particles are removed with the gas stream and trapped in the filtration sleeves 6 made of heat-resistant material and the cyclone filters 7. Fineness of the $MoO_3$ powder is regulated by the residence time in the cooling reactor, which is usually in hundredths of a second. The main high-purity $MoO_3$ powder settles under the action of a centrifugal force initiated by a stream of purified air.

The waste gas mixture containing chlorine derived from the decomposition of molybdenum dioxychloride, as well as nitrogen and oxygen, enters the chlorine regeneration assembly 8, where gaseous chlorine is separated from nitrogen and oxygen and reused in the reactor 1. For safety purposes, the fiberglass scrubber 9 equipped with a pump 10 and containing a solution of NaOH to neutralize chlorine is also provided at the outlet to catch chlorine, which may be released in emergencies or as a result of a breakthrough.

The plant enables recovery of high-purity molybdenum dioxydichlorides $MoO_2Cl_2$ whose purity may reach 99.997-99.999% that are further used to produce high-purity $MoO_3$ powders and nanopowders with the same purity of 99.997-99.999% by means of the low-temperature plasma.

The proposed method makes it possible to use basic process equipment (such as chlorination reactor, sublimation filters, and finished product condensers) made of heat-resistant glass or inexpensive grades of stainless steel to realize the process. Power consumption of the plant makes up a maximum of 165 kW/h. The plant requires the area of 300 m$^2$ at most with a ceiling height of 3.5 m. Due to its small size the equipment does not have any significant requirements to the installation area. Moreover, the plant does not require to be connected to the sewage and water supply system and does not emit harmful substances into the atmosphere as it operates based on a fully closed cycle.

Industrial tests of the equipment were conducted. The product samples were analyzed using the inductively coupled plasma mass spectrometry. Table 1 shows test results involving different samples (LCM1-LCM6).

A plant constructed as an embodiment of the invention enables production of high-purity $MoO_3$ powders with a capacity of 250 tons per annum and even up to 500 tons per annum, which is an unprecedented result having no analogues in the world.

TABLE 1

| Element | PGSICP-MS DL/μg/g | LCM1 Actual/ μg/g | LCM2 Actual/ μg/g | LCM3 Actual/ μg/g | LCM4 Actual/ μg/g | LCM5 Actual/ μg/g | LCM6 Actual/ μg/g |
|---|---|---|---|---|---|---|---|
| Al | 0.1 | 3 | 3 | 6 | 0.4 | 0.3 | 0.2 |
| As | 0.1 | 0.1 | 0.1 | 0.1 | 0.1 | 0.1 | 0.1 |
| B | 0.1 | 0.1 | 0.1 | 0.1 | 1 | 1 | 1 |
| Ba | 0.5 | 0.26 | 0.5 | 1 | 0.5 | 0.7 | 1 |
| Be | 0.1 | 0.1 | 0.1 | 0.1 | 0.1 | 0.1 | 0.1 |
| Bi | 0.1 | 0.1 | 0.1 | 0.1 | 0.1 | 0.1 | 0.11 |
| Ca | 1 | 1 | 1 | 1 | 2 | 1 | 1 |
| Cd | 0.1 | 3 | 2 | 0.1 | 0.1 | 0.1 | 0.1 |
| Co | 0.1 | 0.1 | 0.1 | 0.1 | 0.1 | 0.1 | 0.1 |
| Cr | 0.1 | 0.1 | 0.1 | 0.1 | 0.1 | 0.1 | 0.1 |
| Cu | 0.1 | 0 | 0.1 | 0.1 | 0.1 | 0.1 | 0.1 |
| Fe | 1 | 8 | 5 | 10 | 2.6 | 1.7 | 1.9 |
| Ge | 0.1 | 0.1 | 0.1 | 0.1 | 0.1 | 0.1 | 0.1 |
| Hf | 0.1 | 0.1 | 0.1 | 0.1 | 0.1 | 0.1 | 0.1 |
| K | 0.2 | 1 | 1 | 3 | 0.6 | 0.4 | 0.6 |
| Li | 0.1 | 0.1 | 0.1 | 0.1 | 0.1 | 0.1 | 0.1 |
| Mg | 0.1 | 0.1 | 0.1 | 1 | 0.7 | 0.7 | 0.5 |
| Mn | 0.1 | 0.1 | 0.1 | 0.1 | 0.1 | 0.1 | 0.1 |
| Na | 1 | 2 | 2 | 7 | 5 | 5 | 5 |
| Nb | 0.1 | 0.1 | 0.1 | 0.1 | 0.2 | 0.1 | 0.1 |
| Ni | 0.1 | 0.1 | 0.1 | 1 | 0.6 | 0.6 | 0.6 |
| Pb | 0.1 | 1 | 1 | 1 | 0.1 | 0.1 | 0.1 |
| Re | 0.1 | 0.1 | 0.1 | 0.1 | 0.1 | 0.1 | 0.1 |
| Sn | 0.1 | 0.1 | 0.1 | 0.1 | 0.1 | 0.1 | 0.1 |
| Ta | 0.1 | 0.1 | 0.1 | 0.1 | 0.1 | 0.1 | 0.1 |
| Ti | 0.1 | 0.1 | 0.1 | 0.1 | 0.1 | 0.1 | 0.1 |
| Tl | 0.1 | 0.1 | 0.1 | 0.1 | 0.1 | 0.1 | 0.1 |
| V | 0.1 | 0.1 | 0.1 | 0.1 | 0.1 | 0.1 | 0.1 |
| W | 1 | 1 | 1 | 1 | 1 | 1 | 1 |
| Zn | 0.5 | 4 | 5 | 3 | 0.7 | 0.6 | 0.7 |
| Zr | 0.1 | 0.1 | 0.1 | 0.1 | 0.1 | 0.1 | 0.1 |
| Total | | 26 | 24 | 37 | 17 | 15 | 16 |
| Purity | | 0.99997 | 0.99998 | 0.99996 | 0.99998 | 0.99999 | 0.99998 |

These results confirm the ultra-high purity of all samples taken from different lots and having a different mass.

Many embodiments of the invented method have the shortest process flow, which excludes a number of operations associated with the molybdenum recovery and purification. Moreover, the technology doesn't include stages associated with the hydrometallurgy of rare metals. This made it possible to achieve a very low cost of high-purity and ultra-high purity MoO$_3$ powders and nanopowders, which is several times lower than the cost of methods now being used in the world.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method of molybdenum recovery from a fine molybdenum-bearing ore by low-temperature chlorination, comprising:
chlorination of the fine molybdenum-bearing ore using gaseous chlorine at a temperature of 220-250° C. to form a volatile chloride compound in a reactor; and
decomposing the volatile chloride compound in a low-temperature nitrogen-oxygen plasma unit having a temperature between 800° C. and 1000° C. to produce a MoO$_3$ powder or nanopowder.

2. The method of claim 1, wherein the particle size of the ore is 30-50 μm.

3. The method of claim 1, wherein the reactor is blown down with an inert gas to remove air prior to the chlorination.

4. The method of claim 1, wherein the ore is fed into the reactor through a screw in countercurrent to the gaseous chlorine.

5. The method of claim 1, further comprising filtering the volatile chloride compound through a granular material to remove impurities before the decomposing in the plasma unit.

6. The method of claim 1, further comprising trapping particles of the MoO$_3$ powder or nanopowder in filtration sleeves.

7. The method of claim 1, further comprising:
removing nitrogen or oxygen from chlorine exiting the plasma unit; and
transferring the chlorine to the reactor for reuse.

8. The method of claim 1, further comprising
generating chlorine leaks; and
neutralizing the chlorine leaks with alkali in a scrubber.

9. The method of claim 1, further comprising cooling the MoO$_3$ powder or nanopowder.

10. An apparatus for the method of claim 1, comprising:
a reactor for low-temperature chlorination of molybdenum-bearing ore capable of maintaining a temperature in the range of 220-250° C.; and
a low-temperature nitrogen-oxygen plasma unit capable of operating at a temperature between 800° C. and 1000° C. for decomposition of chlorinated molybdenum compound generated in the reactor.

11. The apparatus of claim 10, further comprising a filtration unit between the reactor and the plasma unit for removal of impurities from the chlorinated molybdenum compound.

12. The apparatus of claim 11, wherein the filtration unit comprises at least one reservoir with granular reagents installed in a gas duct and designed specifically for trapping each impurity.

13. The apparatus of claim 10, further comprising a scrubber for alkaline neutralization of chlorine leaks.

14. The apparatus of claim 10, further comprising at least one temperature sensor, at least one pressure sensor, at least one raw material or reagent feed sensor, or at least one finished product discharge sensor for automated control of the apparatus.

15. The apparatus of claim 10, further comprising heater for heating gaseous chlorine up to between 50° C. and 60° C. before the gaseous chlorine enters the reactor.

16. The apparatus of claim 10, wherein the reactor is configured to receive an inert gas for preliminary blowdown.

17. The apparatus of claim 10, further comprising a hopper to collect the MoO$_3$ powder or nanopowder produced in the plasma unit.

18. The apparatus of claim 10, further comprising a chlorine regenerator for separating gaseous chlorine from gaseous impurities for subsequent use in the chlorination reactor.

19. The method of claim 1, wherein the volatile chloride compound is MoO$_2$Cl$_2$.

20. The apparatus of claim 10, wherein the chlorinated molybdenum compound generated in the reactor is MoO$_2$Cl$_2$.

* * * * *